Patented May 14, 1929.

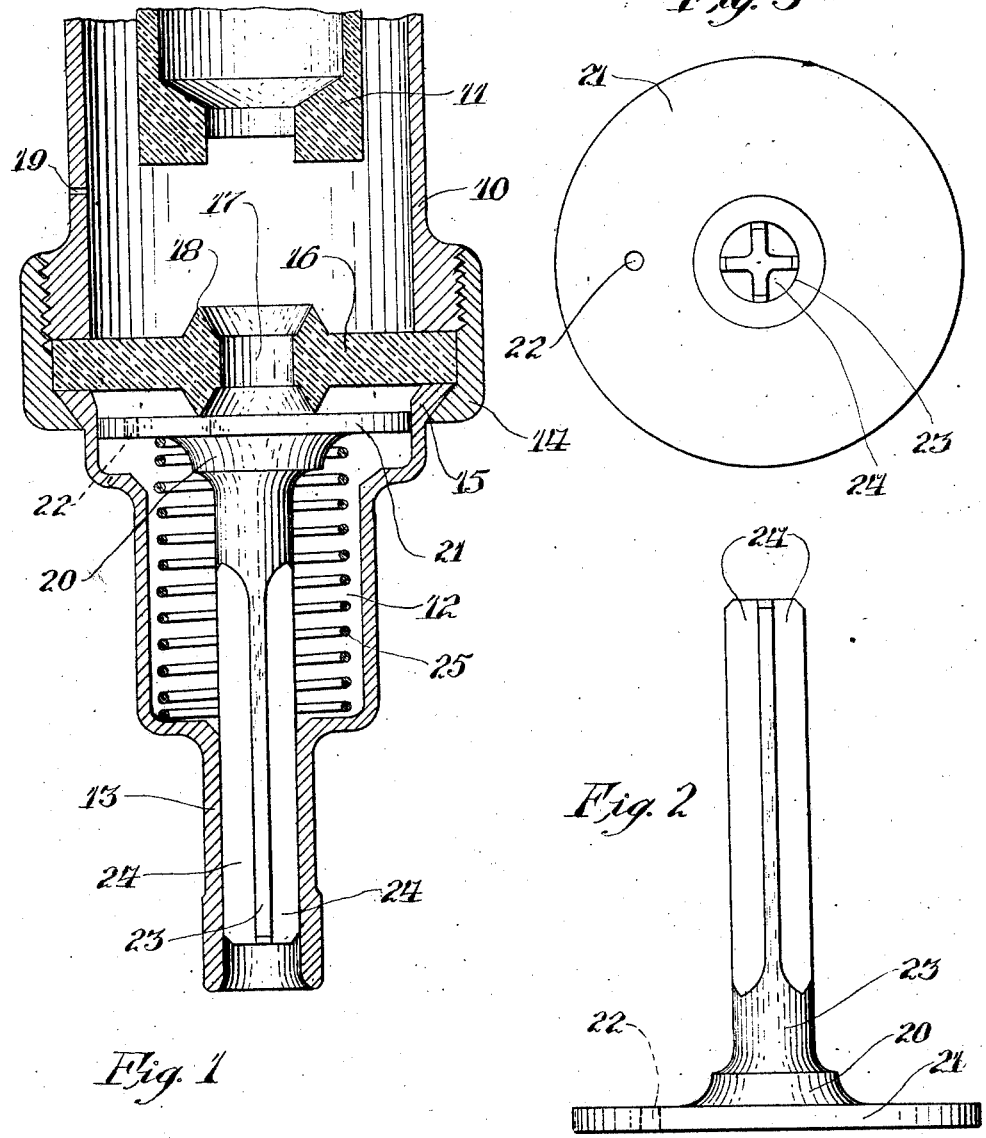

1,712,798

UNITED STATES PATENT OFFICE.

EDWARD A. JOHNSTON AND FLOYD G. HODSDON, OF CHICAGO, ILLINOIS, ASSIGNORS TO INTERNATIONAL HARVESTER COMPANY, OF CHICAGO, ILLINOIS, A CORPORATION OF NEW JERSEY.

TEAT CUP FOR MILKING MACHINES.

Application filed December 23, 1926. Serial No. 156,547.

This invention relates to milking machines and particularly to an improved teat cup construction for use in milking machines of the suction or vacuum type.

It is the main object of the invention to provide such a teat cup, including a novel form of pulsating mechanism, which will properly control the vacuum and primarily be dependent for such controlling action upon the milk flow from the teat, and atmospheric pressure, whereby harmful overmilking cannot take place.

A further object is to provide a teat cup comprising a minimum number of parts, so that the same may be cheaply manufactured and may readily be kept clean.

Other objects will be apparent as the present description progresses.

These very desirable objects are accomplished, briefly, in a teat cup construction, embodying an upper teat chamber or body, and a lower or milk chamber, the two chambers being communicable by means of an apertured diaphragm clamped between the two chambers, but being normally separated by a novel form of valve covering or closing the aperture in the diaphragm. The teat chamber is in communication with the atmosphere by means of a pin hole in the wall, and the lower, or milk chamber, is formed with a suction connection to a source of vacuum. By starting the vacuum, certain forces, later to be described, act to milk the cow by a proper pulsating action.

In the accompanying sheet of drawings showing an illustrative embodiment of this invention,—

Figure 1 is a side elevational view, on an enlarged scale, of the improved teat cup, the upper end of the device being omitted, as it is unnecessary to this disclosure;

Figure 2 is a side elevational view, also enlarged, of the improved valve; and

Figure 3 is a bottom plan view, on the same scale, of the valve.

The improved teat cup comprises the usual elongated, hollow, tubular, metallic body 10, wherein is suspended and supported in a conventional manner, a rubber liner 11 for receiving a teat in the usual way. A cup-shaped chamber 12, having a nipple or suction connection 13 protrudes centrally from the bottom of the chamber 12, and is in communication with any conventional source of vacuum, as will be understood by those familiar with this art. The cup 12 is securely connected to the lower end of the body 10 by means of a threaded locking collar 14, as shown. The upper edge of the cup or chamber 12 is formed with an outwardly extended flange 15, which is engaged by a complementary portion on the collar 14, and on which rests the circumferential edge of the rubber diaphragm 16 in such a manner that it is interposed like a gasket between the top edge of the chamber 12 and the lower edge of the body 10, thereby insuring at all times an air tight connection between the upper and lower chambers.

The diaphragm 16 is centrally apertured at 17 to form a milk outlet for the body, said diaphragm, furthermore, being of fairly thick rubber and lying between the body 10 and cup 12 without being stretched. The diaphragm, thus, it will be seen, separates the entire teat cup into two chambers, one being an upper, or teat chamber, above the diaphragm, and the other being a lower, or milk chamber, below the diaphragm. It is also to be noted that the suction connection is in line with the aperture 17 in the diaphragm. The diaphragm is also thickened on both sides at its center adjacent the aperture 17, as at 18, and, therefore, it is unnecessary to exercise care in placing the diaphragm in any particular position, as both sides are exactly alike. The upper chamber is in communication with the atmosphere by means of a pin hole 19 through the wall of the body 10.

In the lower chamber there is arranged a valve 20 having a head 21 formed with an offset aperture 22, the valve also including an elongated stem 23 projecting downwardly into the suction connection 13. This stem is provided with a plurality of by-passes 24, as shown. It is to be observed that the valve, in its reciprocation, is guided at two spaced points, the one through the contact of the head 21 with the sides of the chamber, and the other by means of the stem fitting into the connection 13. A coil spring 25, of non-corrosive metal, encircles the valve stem and seats at its ends on the lower face of the head 21 and the bottom of the cup or chamber 12, said spring exerting just enough pressure to seat the flat top side of the valve head against the diaphragm 16 at its lower thickened portion 18, when the air in the upper and lower chambers is under an equalized pressure.

The manner of operation of the present improved teat cup will now be described. The teat cup is applied to a teat of a cow in such a manner that the liner 11 will embrace the teat in the usual way. A hose, not shown, is connected to the nipple connection 13, and to a source of vacuum, such as a milk can, under vacuum. The suction will exhaust the air rapidly from the lower, or milk chamber 12, and, in view of the fact that the upper chamber above the diaphragm is exposed to the atmosphere by means of the hole 19, obviously such atmospheric pressure will immediately be operative to push down on the flat top of the valve head 21 through the diaphragm aperture 17, and move the valve downwardly away from the diaphragm against the force of the spring 25. With the valve 20 down and away from the diaphragm 16, the vacuum will rapidly spread into the upper chamber by traveling through the by-passes 24, the aperture 22 in the valve head, and the diaphragm aperture 17. This suction will now dilate the liner 11 and milk will flow from the cow's teat. The milk passes through the hole 17, over the top of the valve head 21, through the hole 22 therein, and down through the chamber 12 and the by-passes 24 in the connection 13, and then through the suction hose to the milk can (not shown).

With the upper chamber thus under vacuum, the valve is in equilibrium with a vacuum thereabove and therebelow, so that the spring 25 can now exert its force to clamp the valve 20 once more against the diaphragm to close the aperture 17. This vacuum in the upper chamber is now gradually decreased by the inflow of the atmosphere through the hole 19 and the milk flow from the teat until the valve member is no longer in equilibrium, when it begins to open slightly, allowing the milk and air in a decreasing vacuum to spread over the entire diameter of the valve head 21 faster than it can be drained away through the hole 22. The valve is thus forced down quickly. Due to gravity, the milk is drawn off first, but, if the flow of milk and air through the hole 22 and by-passes 24 is not sufficient to bring the valve in equilibrium again, the milk will flow from the teat uninterruptedly. If the milk flows very freely, so that the valve remains open, the suction is constant, as it should be, for when the cow gives her milk freely, it should be sucked out continuously. These pulsations occur intermittently at the rate of about 60 to 120 per minute while milk flows slowly or not at all from the teat, but when the flow of milk increases and the cow gives it down freely, these pulsations become less marked and the valve 20, instead of clicking perceptibly, in effect, merely flutters slightly.

A cluster of four cups may be left on the cow's udder until all teats are milked, it being a well known fact that all teats do not give milk equally at the same rate of flow or at the same time. With the use of the present teat cup, no harm will be done the cow if the teats do not milk uniformly, as each cup will operate entirely independently of the others and would automatically have its pulsations controlled by the milk flow from the particular teat. With this improved teat cup, it can now be seen, the cow will be thoroughly and rapidly milked without causing her any injury.

It must now be appreciated that the teat cup of this invention is very simple and, as it is constructed of a minimum number of parts, it can be easily and cheaply manufactured, and, furthermore, be kept clean and sanitary with a minimum of effort. In cleaning the teat cup, the same is taken apart by turning the threaded collar 14, which may be knurled to facilitate turning, and thus separating the body 10 from the cup 12.

Of course, only an illustrative embodiment of the invention has been shown and described, and accordingly it should be understood that the same is capable of changes and modifications, and that it is the intent to include all such variations which fall within the spirit and scope of this invention, as is indicated in the subjoined claims.

What is claimed is:

1. In a teat cup, the combination of a body having atmospheric communication, a chamber communicating therewith and having a suction connection, and a reciprocatory valve in the chamber having a stem formed with a plurality of by-passes, said stem with its by-passes extending into the suction connection to guide the valve in its reciprocatory movement.

2. In a teat cup, the combination of a body having atmospheric communication, a chamber communicating therewith, a suction connection for the chamber, and a valve in the chamber having a head engaging the chamber wall, said valve having a stem arranged in and engaging the wall of the suction connection, whereby the valve will be properly guided in its movement.

3. In a teat cup, the combination of a body having atmospheric communication, a chamber communicating therewith, a suction connection for the chamber, and a valve slidably mounted in the chamber, said valve having a head and a stem, the head slidably engaging the chamber wall and the stem slidably fitting into the suction connection.

4. In a teat cup, the combination of a body, a chamber having a suction connection, an apertured diaphragm between the body and chamber, a valve slidably mounted in the chamber, said valve having a stem extending into the suction connection and formed with a by-pass, and resilient means urging the valve against the opening in said diaphragm.

5. In a teat cup, the combination of a body, a chamber having a suction connection, an apertured diaphragm between the body and chamber, a valve slidably mounted in the chamber, said valve having a stem extending into the suction connection and formed with a plurality of by-passes, and means encircling the stem for urging the valve to close the opening in the diaphragm.

6. In a teat cup, the combination of a body, a chamber having a suction connection, an apertured diaphragm between the body and chamber, a valve slidably mounted in the chamber, said valve having a head and a stem formed with a by-pass, the stem extending into the suction connection, and a spring encircling the stem and urging the head of said valve to close the opening in the diaphragm.

7. In a teat cup, the combination of a body communicating with the atmosphere, a chamber connected to the body and having a suction connection, a diaphragm between the body and chamber, said diaphragm having an opening therein in line with the suction connection, said diaphragm permitting communication between the body and chamber, a valve, said valve comprising an apertured head engaging the wall of the chamber and a stem formed with a by-pass extending into the suction connection, and means urging the valve to seat against the diaphragm to interrupt communication between the chamber and body.

In testimony whereof we affix our signatures.

EDWARD A. JOHNSTON.
FLOYD G. HODSDON.